(12) United States Patent
Kim et al.

(10) Patent No.: US 7,402,107 B2
(45) Date of Patent: Jul. 22, 2008

(54) DRIVE PLATE ASSEMBLY STRUCTURE FOR TORQUE CONVERTER

(75) Inventors: Sung-Kwang Kim, Seoul (KR); Byoung-Chul Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 166 days.

(21) Appl. No.: 11/299,710

(22) Filed: Dec. 12, 2005

(65) Prior Publication Data

US 2006/0128480 A1 Jun. 15, 2006

(30) Foreign Application Priority Data

Dec. 10, 2004 (KR) .................. 10-2004-0104131

(51) Int. Cl.
*F16D 1/06* (2006.01)
(52) U.S. Cl. .......................... 464/23; 403/14
(58) Field of Classification Search ................ 192/3.28, 192/3.29; 464/23; 74/606 R; 403/13, 14, 403/27

See application file for complete search history.

(56) References Cited

U.S. PATENT DOCUMENTS 6,615,962 B2 * 9/2003 Back et al. ................ 192/3.28

FOREIGN PATENT DOCUMENTS

| DE | 19812687 A1 | 9/1999 |
| DE | 10212033 B3 | 1/2004 |
| DE | 10342035 A1 | 4/2004 |

* cited by examiner

*Primary Examiner*—Greg Binda
(74) *Attorney, Agent, or Firm*—Morgan Lewis & Bockius LLP

(57) ABSTRACT

A bent portion is protrusively formed at one side of each hole of a crank position sensor-wheel plate that is coupled to the rim of a drive plate, thereby facilitating the observation of misalignment in rotational positions of the drive plate and front cover as well as the alignment of bolt coupling holes of the drive plate and bolt coupling holes of the front cover during the attachment of the drive plate to the front cover.

10 Claims, 5 Drawing Sheets

DRIVE PLATE ASSEMBLY STRUCTURE FOR TORQUE CONVERTER

CROSS-REFERENCE TO RELATED APPLICATIONS

The present application is based on, and claims priority from, Korean Application Serial Number 10-2004-0104131, filed on Dec. 10, 2004, the disclosure of which is hereby incorporated by reference herein in its entirety.

FIELD OF THE INVENTION

The present invention relates to a drive plate assembly structure for a torque converter to facilitate attachment of the torque converter to the crankshaft when the automatic transmission is secured to the engine.

BACKGROUND OF THE INVENTION

In vehicles with automatic transmissions, the transmission is typically affixed to the engine in the following steps: The middle portion of a drive plate is fastened with screws to one end of a crankshaft via an adaptor; then the rim of the drive plate is coupled to the front cover of a torque converter with screws.

When the drive plate is screwed to the front cover, bolt coupling holes of each member should be exactly aligned. The bolt coupling holes are, however, obscured from view by a crank position sensor-wheel plate that is coupled to the rim of the drive plate. Therefore, the user must rotate the crankshaft or torque converter to align the bolt coupling holes of the drive plate and the front cover.

SUMMARY OF THE INVENTION

Embodiments of the present invention include bent portions of a crank position sensor-wheel plate that is coupled to the outer circumference of a drive plate, thereby facilitating the observation of inconsistencies between rotational positions of the drive plate and front cover as well as misalignments of the bolt coupling holes of the drive plate and the bolt coupling holes of the front cover during the assembly of the drive plate and front cover.

A drive plate assembly structure for a torque converter includes a drive plate that is coupled at the center portion thereof to one end of a crankshaft and is attached at the outer periphery thereof to a crank position sensor-wheel plate. The periphery of a front cover of a torque converter penetrates the crank position sensor-wheel plate and contacts the drive plate.

The crank position sensor-wheel plate is formed with a plurality of holes for accommodating bosses formed on the front cover. The holes are integrally formed at one end thereof with bent portions that protrude toward the front cover. The bent portions serve to maintain a constant clearance between the drive plate and front cover when the drive plate and front cover are rotationally misaligned. If the drive plate and front cover are aligned correctly, the bent portions maintain a consistent alignment between bolt coupling holes of the drive plate and bolt coupling holes of the bosses.

The holes are formed at one end thereof with a cut portion for reducing the weight of the crank position sensor-wheel plate. Multiple holes, bent portions, and cut portions are arranged at a fixed distance from the center of the crank position sensor-wheel plate and are a fixed distance from one another.

The distance between one end of each hole of the crank position sensor-wheel plate and each bolt-coupling hole of the drive plate should be equal to the distance between one end of each boss and each bolt coupling hole of the boss.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
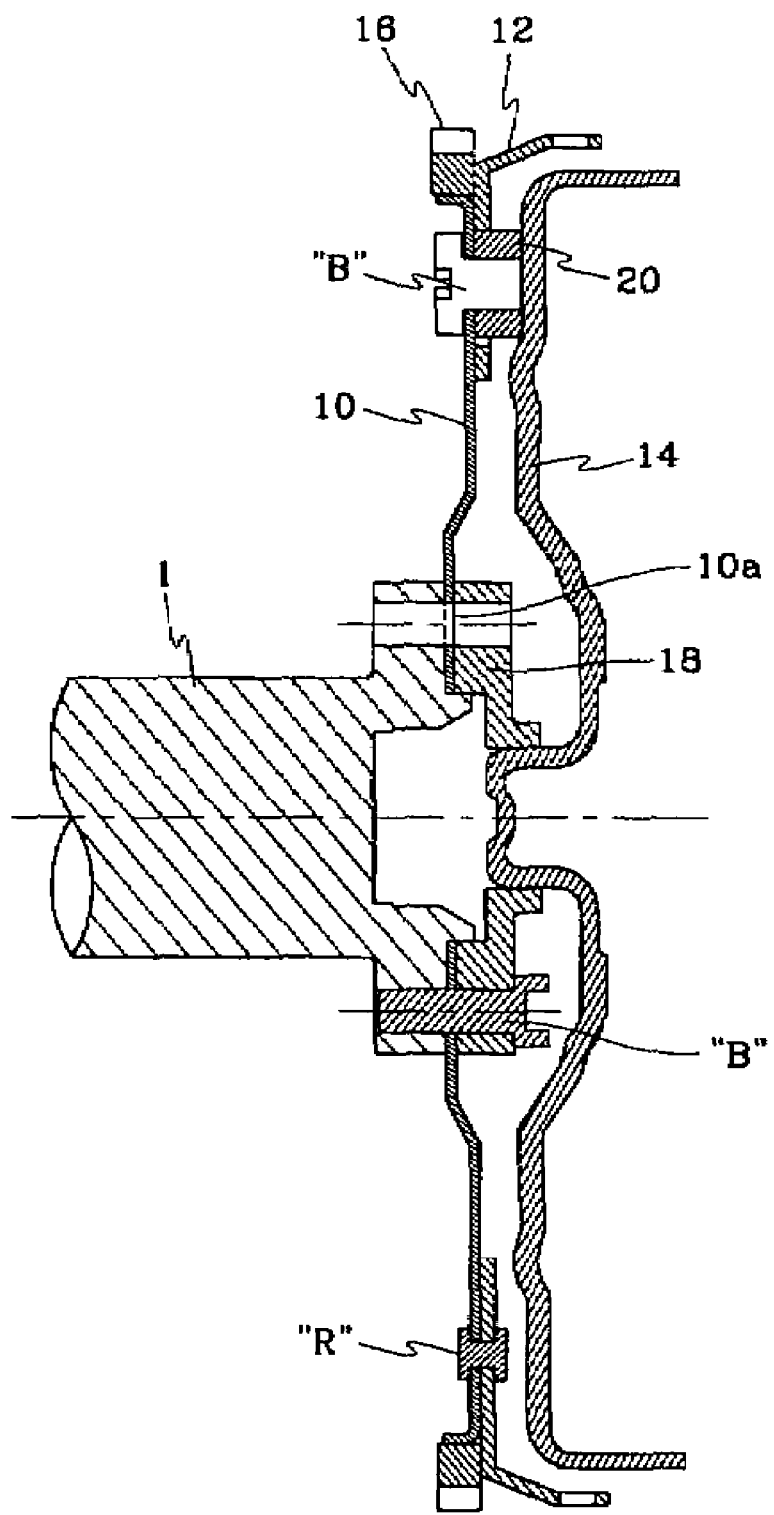
FIG. 1 is a cross-sectional view of a drive plate assembly structure for a torque converter according to an embodiment of the present invention.
Figure 2:
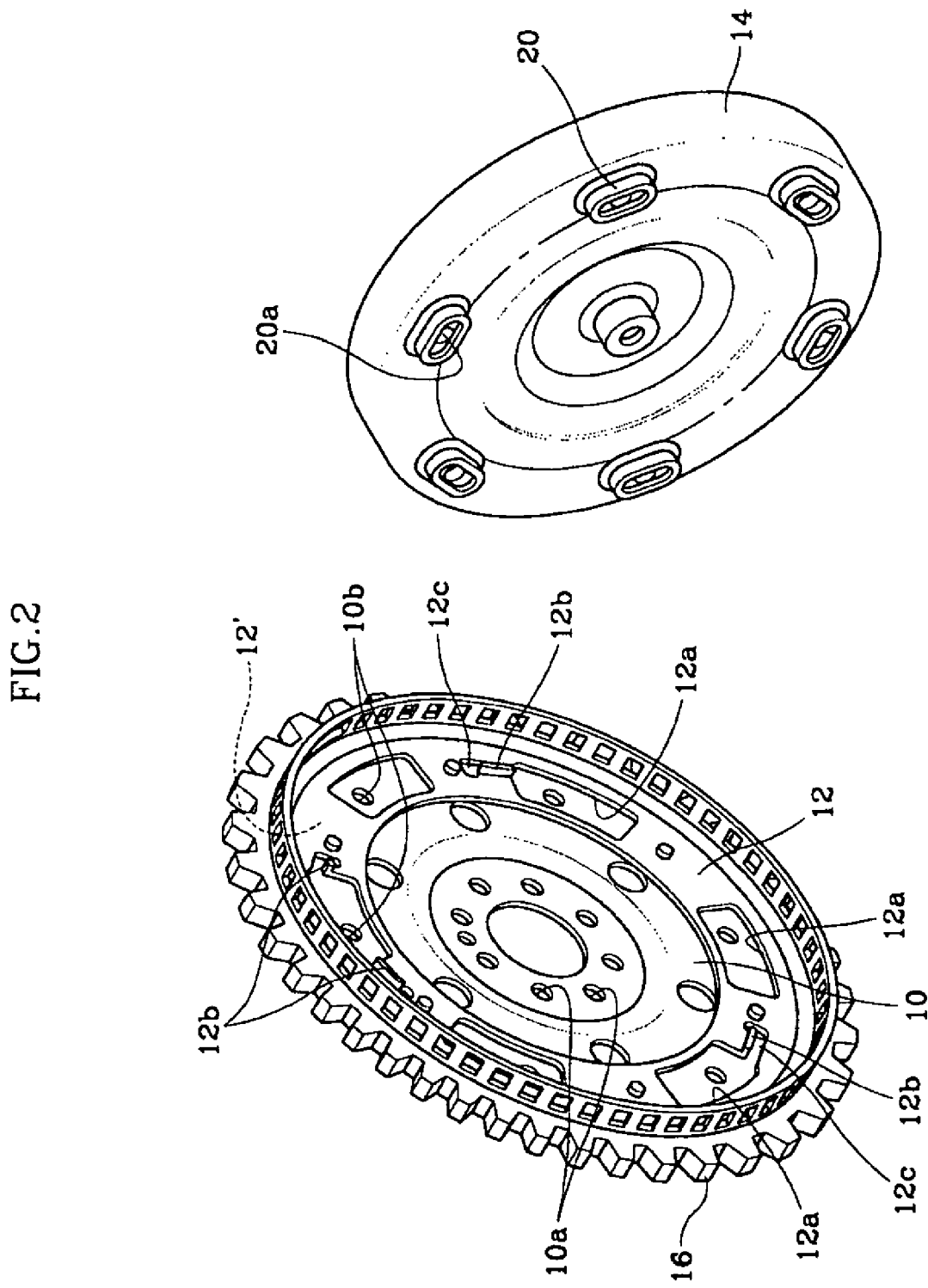
FIG. 2 is a perspective view illustrating a disassembly of a drive plate and front cover of FIG. 1.
Figure 3:
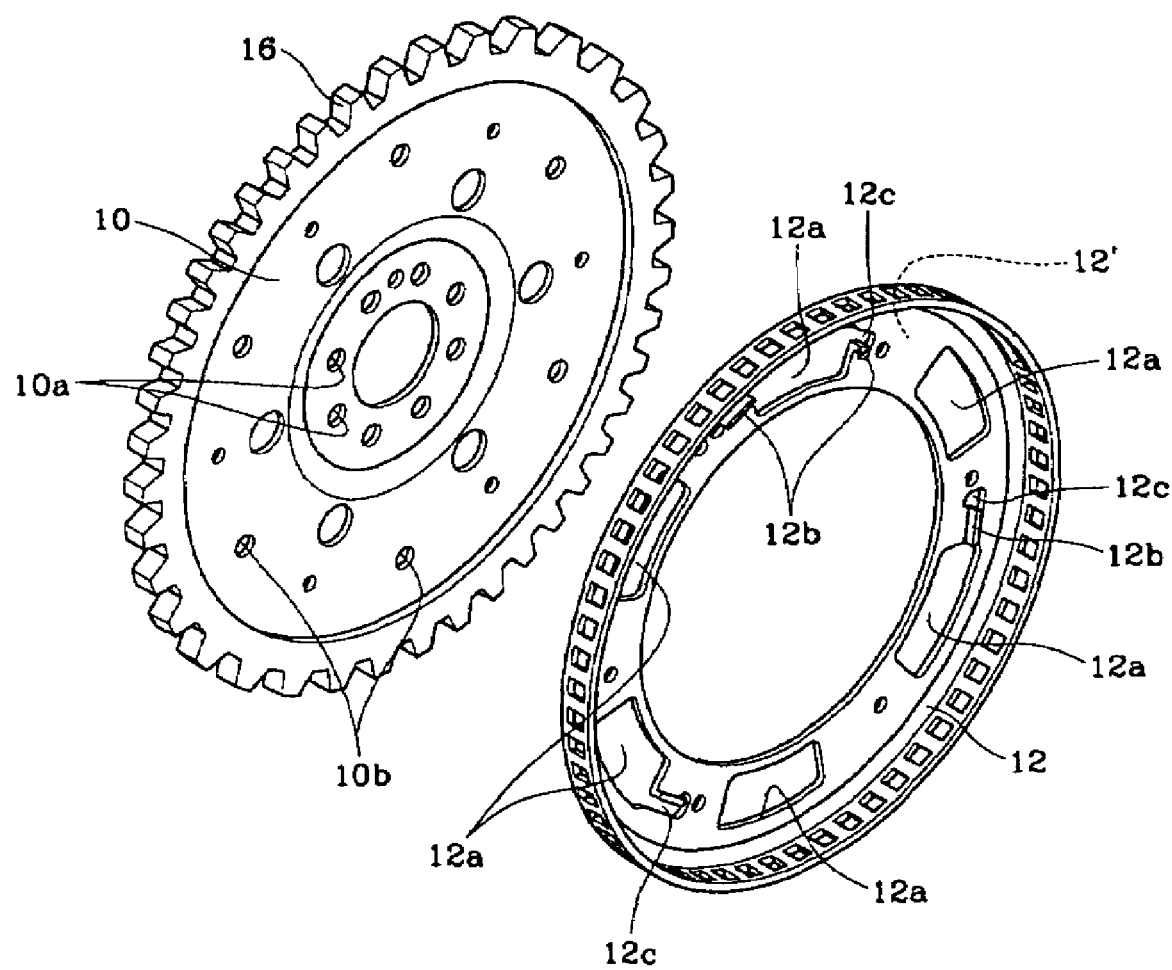
FIG. 3 is a perspective view of a disassembled drive plate of FIG. 2.

With reference to FIGS. 1 to 3, a drive plate 10 is attached at a center portion thereof to one end of a crankshaft 1. The outer periphery of drive plate 10 is attached to a crank position sensor-wheel plate 12 that contacts the periphery of a front cover 14 of a torque converter (not shown). A ring gear 16 is affixed to the rim of drive plate 10.

Drive plate 10 is in the shape of a disk and is formed at the center portion thereof with a plurality of bolt coupling holes 10a for being screwed to one end of crankshaft 1 via an adaptor 18. The edge portion of drive plate 10 is also formed with a plurality of bolt coupling holes 10b for attachment to front cover 14 with screws. Each set of bolt coupling holes 10a and 10b is arranged at a fixed distance from the center of drive plate 10.

Crank position sensor-wheel plate 12 is disk shaped with a hole in the center and includes a contact portion 12' that closely attaches to the edge surface of drive plate 10. Crank position sensor-wheel plate 12 also has a plurality of holes 12a for accommodating bosses 20, which are integrally coupled to front cover 14, thereby directly contacting bosses 20 to drive plate 10. Holes 12a may be oblong in shape.

One end of some of the holes 12a is integrally formed with a bent portion 12b that protrudes perpendicularly from the surface of crank position sensor-wheel plate 12 toward front cover 14, thereby maintaining a constant clearance between drive plate 10 and front cover 14 when drive plate 10 and front cover 14 are rotationally misaligned.

If drive plate 10 and front cover 14 are correctly aligned, bent portions 12b maintain alignment between bolt coupling holes 10b of drive plate 10 and bolt coupling holes 20a of boss 20.

Multiple holes 12a and bent portions 12b are formed on the crank position sensor-wheel plate 12 as described above. Some holes 12a are formed at one side thereof with a cut portion 12c for reducing the weight of the crank position sensor-wheel plate 12. Holes 12a, bent portions 12b, and cut portions 12c are arranged at a fixed distance from the center of crank position sensor-wheel plate 12 and are positioned a fixed distance from one another, thus effectively balancing the weight of the crank position sensor-wheel plate 12 during the rotation thereof.

In the drawings, "B" refers to a bolt that couples crankshaft 1 and adaptor 18 as well as a bolt that couples drive plate 10 and boss 20. "R" refers to a rivet, which couples drive plate 10 and crank position sensor-wheel plate 12.

Figure 4:
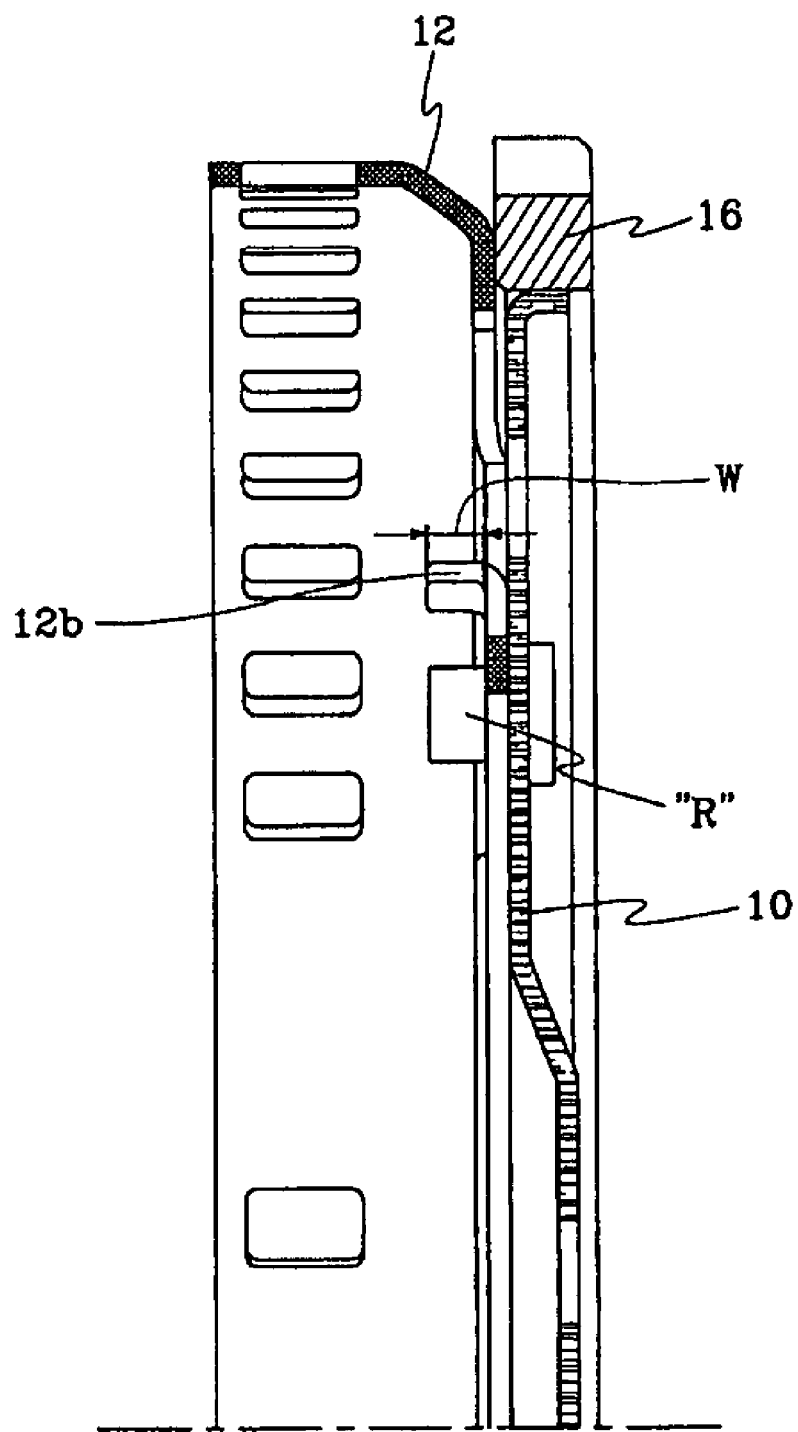
FIG. 4 is a cross-sectional view illustrating the protruded height of a bent portion of a crank position sensor-wheel plate shown in FIG. 1.

As illustrated in FIG. 4, the height (W) bent portion 12b is at least 5 mm. This allows the user to observe whether boss 20 is accurately inserted in hole 12a of crank position sensor-wheel plate 12 during the assembly of drive plate 10 and front cover 14.

During the assembly of drive plate 10 and front cover 14, if boss 20 is not completely entered into hole 12a of crank position sensor-wheel plate 12 and randomly contacts an edge of bent portion 12b, a clearance of at least 5 mm is formed between drive plate 10 and front cover 14. In this instance, the user can recognize that boss 20 is misaligned with crank position sensor-wheel plate 12 and can then rotate front cover 14 to place boss 20 in hole 12a.

If the height of the rivet (R) that couples drive plate 10 and crank position sensor-wheel plate 12 is equal to the height of bent portion 12b, the rivet (R) also helps the user observe whether boss 20 is misaligned with hole 12a of crank position sensor-wheel plate 12 in an inconsistent state.

Figure 5:
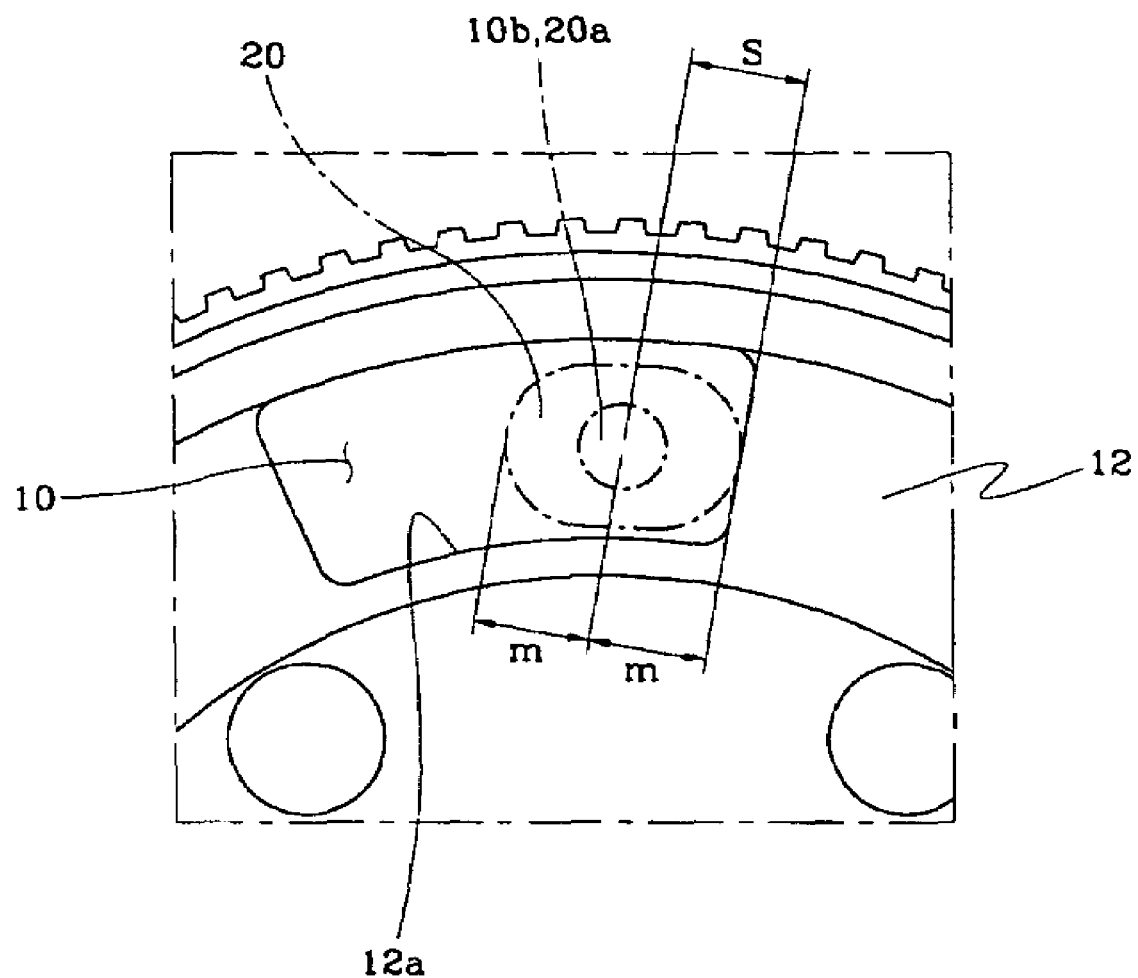
FIG. 5 is a view illustrating a boss placed in a hole of a crank position sensor-wheel plate during the assembly of a front cover and drive plate according to an embodiment of the present invention.

As illustrated in FIG. 5, when one end of hole 12a of crank position sensor-wheel plate 12 contacts one end of boss 20, bolt coupling hole 10b of drive plate 10 and bolt coupling hole 20a of boss 20 are aligned. The distance (s) between one end of hole 12a and bolt coupling hole 10b of drive plate 10 should be identical to the distance (m) between one end of boss 20 and bolt coupling hole 20a.

If bosses 20 are placed in holes 12a and front cover 14 is rotated such that one end of each boss 20 contacts one end of each hole 12a, then bolt coupling holes 10b of drive plate 10 and bolt coupling holes 20a of bosses 20 are automatically aligned, facilitating the attachment of drive plate 10 to front cover 14.

As a result, the user can easily carry out the assembly process without having to directly observe the alignment of bolt coupling holes 10b of drive plate 10 and bolt coupling holes 20a of bosses 20.

As apparent from the foregoing, there is an advantage in that when drive plate 10 is screwed to crankshaft 1 of the engine and is attached to front cover 14 with screws, boss 20 of front cover 14 can easily be aligned with hole 12a of crank position sensor-wheel plate 12 that is coupled to drive plate 10. In addition, bolt coupling hole 10b of drive plate 10 and bolt coupling hole 20a of boss 20 can also be easily aligned, thereby improving the attaching efficiency of the automatic transmission to the engine, and developing the assembly process of the torque converter while the transmission is assembled to the engine.

What is claimed is:

1. A drive plate assembly structure for a torque converter, comprising:
   a crankshaft;
   a drive plate having a center portion and an outer periphery;
   the torque converter having a front cover, said front cover being formed with a plurality of bosses; and
   a crank position sensor-wheel plate provided with a plurality of holes and positioned between said drive plate and said front cover;
   wherein the drive plate is attached at the center portion to an end of the crankshaft and attached at the outer periphery to the crank position sensor-wheel plate;
   wherein said bosses of the front cover penetrate the crank position sensor-wheel plate and contact the drive plate;
   wherein said holes of the crank position sensor-wheel plate are configured and dimensioned to accommodate said bosses;
   and wherein at least one of said holes is integrally formed at one end with a bent portion that protrudes toward said front cover, wherein said bent portion maintains a constant clearance between the drive plate and the front cover when the drive plate and the front cover are rotationally misaligned and wherein said bosses are disposed in said holes when the drive plate and the front cover are rotationally aligned.

2. The structure as defined in claim 1, wherein the holes and bent portions are a first distance from the center of said crank position sensor-wheel plate and each of the holes is a second distance from each adjacent hole.

3. The structure as defined in claim 1, wherein said bent portion protrudes at least 5 mm toward said front cover.

4. The structure as defined in claim 1,
   wherein the drive plate further comprises a plurality of first bolt coupling holes;
   wherein each of said first bolt coupling holes is a third distance from an edge of one of said holes of said crank position sensor-wheel plate;
   wherein each of said bosses comprises a second bolt coupling hole; and
   wherein each of said second bolt coupling holes is said third distance from an end of said boss.

5. The structure as defined in claim 1, wherein each of said holes comprises a cut portion at one end thereof.

6. The structure as defined in claim 5, wherein the holes, bent portions, and cut portions are a first distance from the center of said crank position sensor-wheel plate and each of the holes is a second distance from each adjacent hole.

7. A drive plate assembly structure for a torque converter, comprising:
   a drive plate configured to be coupled at a center portion to a crankshaft; and
   a crank position sensor-wheel plate secured around a periphery of one side of said drive plate and having a central opening configured and dimensioned for receiving a front cover of the torque converter therethrough for connection with the crankshaft, said crank position sensor-wheel plate defining a plurality of oblong openings distributed around an annular portion thereof, said oblong openings being configured and dimensioned to accommodate bosses formed on the front cover, at least one of said oblong openings having a bent over edge portion protruding in a direction of the front cover;
   wherein said crank position sensor-wheel plate is positioned between said drive plate and said front cover, and
   wherein the bent over edge portion maintains a constant clearance between the drive plate and the front cover when the drive plate and the front cover are rotationally misaligned and wherein said bosses are disposed in said oblong openings when the drive plate and the front cover are rotationally aligned.

8. The drive plate assembly of claim 7, wherein a plurality of bent over edge portions are provided.

9. The drive plate assembly of claim 8, wherein the plurality of bent over edge portions is less in number than the plurality of oblong openings.

10. The drive plate assembly of claim 9, wherein said bent over edge portions protrude about 5 mm.

* * * * *